United States Patent
Beukema et al.

(10) Patent No.: US 7,577,794 B2
(45) Date of Patent: Aug. 18, 2009

(54) LOW LATENCY COHERENCY PROTOCOL FOR A MULTI-CHIP MULTIPROCESSOR SYSTEM

(75) Inventors: Bruce L. Beukema, Hayfield, MN (US); Russell D. Hoover, Rochester, MN (US); Jon K. Kriegel, Rochester, MN (US); Eric O. Mejdrich, Rochester, MN (US); Sandra S. Woodward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 10/961,751

(22) Filed: Oct. 8, 2004

(65) Prior Publication Data

US 2006/0080513 A1    Apr. 13, 2006

(51) Int. Cl.
*G06F 12/00*    (2006.01)
(52) U.S. Cl. .................. 711/141; 711/146; 711/133
(58) Field of Classification Search .............. 711/141, 711/146, 133
See application file for complete search history.

(56) References Cited

U.S. PATENT DOCUMENTS

| | | | |
|---|---|---|---|
| 5,113,514 A * | 5/1992 | Albonesi et al. ............ 711/144 |
| 5,274,782 A * | 12/1993 | Chalasani et al. ........... 710/317 |
| 5,291,442 A * | 3/1994 | Emma et al. ................ 711/120 |
| 5,581,705 A | 12/1996 | Passint et al. |
| 5,841,973 A | 11/1998 | Kessler et al. |
| 5,890,217 A * | 3/1999 | Kabemoto et al. .......... 711/141 |
| 6,067,611 A * | 5/2000 | Carpenter et al. ............. 712/28 |
| 6,092,173 A * | 7/2000 | Sasaki et al. ................ 712/14 |
| 6,124,868 A | 9/2000 | Asaro et al. |
| 6,321,298 B1 * | 11/2001 | Hubis ......................... 711/124 |
| 6,363,438 B1 | 3/2002 | Williams et al. |
| 6,449,699 B2 | 9/2002 | Franke et al. |
| 6,530,003 B2 * | 3/2003 | Bakke et al. ................. 711/162 |
| 6,725,296 B2 | 4/2004 | Craddock et al. |
| 6,801,207 B1 * | 10/2004 | Tischler et al. .............. 711/122 |
| 6,801,208 B2 | 10/2004 | Keshava et al. |
| 6,820,143 B2 | 11/2004 | Day et al. |
| 6,820,174 B2 | 11/2004 | Vanderwiel |
| 6,898,679 B2 * | 5/2005 | Sadowsky et al. ........... 711/158 |
| 2002/0103948 A1 * | 8/2002 | Owen et al. .................. 710/33 |
| 2004/0117592 A1 | 6/2004 | Day et al. |
| 2004/0162946 A1 | 8/2004 | Day et al. |
| 2004/0263519 A1 | 12/2004 | Andrews et al. |
| 2005/0198187 A1 * | 9/2005 | Tierney et al. .............. 709/214 |

OTHER PUBLICATIONS

Anireddha S. Vaidya, Impact of Virtual Channels and Adaptive Routing on Application Performance, Feb. 2001, IEEE Transactions on Parallel and Distributed Systems, vol. 12, No. 2, pp. 223-237.*

* cited by examiner

*Primary Examiner*—Brian R Peugh
*Assistant Examiner*—Victor W Wang
(74) *Attorney, Agent, or Firm*—Patterson & Sheridan LLP (57) ABSTRACT

Methods and apparatus for reducing the amount of latency involved when accessing, by a remote device, data residing in a cache of a processor are provided. For some embodiments, virtual channels may be utilized to conduct request/response transactions between the remote device and processor that satisfy a set of associated coherency rules.

5 Claims, 11 Drawing Sheets

| GPU REQUEST | FSB REQUEST | FSB RESPONSE |
|---|---|---|
| LOAD FROM MEMORY | RWITM OR READ | RESPONSE WITH L2 DATA OR REFLECTED READ |
| LOAD FROM L2 (LOCKED SET) | READ OR RWNITC | RESPONSE WITH L2 DATA |
| STORE TO MEMORY | FLUSH OR RWITM | RESPONSE WITH L2 DATA OR REFLECTED WRITE |

LOW LATENCY COHERENCY PROTOCOL FOR A MULTI-CHIP MULTIPROCESSOR SYSTEM

CROSS-REFERENCE TO RELATED APPLICATIONS

This application is related to commonly owned U.S. Patent applications entitled "Enhanced Bus Transactions for Efficient Support of a Remote Cache Directory Copy", (U.S. Ser. No. 10/961,742), "Direct Access of Cache Lock Set Data Without Backing Memory" (now U.S. Pat. No. 7,475,190), "Graphics Processor With Snoop Filter" (U.S. Ser. No. 10/961,750), "Snoop Filter Directory Mechanism in Coherency Shared Memory System" (now U.S. Pat. No. 7,305,524), which are herein incorporated by reference.

BACKGROUND OF THE INVENTION

1. Field of the Invention

This application generally relates to data processing systems and, more particularly, to systems in which multiple processing devices may access the same shared data stored in memory.

2. Description of the Related Art

In a multiprocessor system, or any type of system that allows more than one device to request and update blocks of shared data concurrently, it is important that some mechanism exists to keep the data coherent (i.e., to ensure that each copy of data accessed by any device is the most current copy). In many such systems, a processor has one or more caches to provide fast access to data (including instructions) stored in relatively slow (by comparison to the cache) external main memory. In an effort to maintain coherency, other devices on the system (e.g.; a graphics processing unit-GPU) may include some type of coherency (or "snoop") logic to determine if a copy of data from a desired memory location is held in the processor cache by sending commands (snoop requests) to the processor cache directory.

This snoop logic is used to determine if desired data is contained in the processor cache and if it is the most recent copy. If so, in order to work with the latest copy of the data, the device may request ownership of the modified data stored in a processor cache line. In a conventional coherent system, other devices requesting data do not know ahead of time whether the data is in a processor cache. As a result, these devices must snoop every memory location that it wishes to access to make sure that proper data coherency is maintained. In other words, the requesting device must literally interrogate the processor cache for every memory location that it wishes to access, which can be very expensive both in terms of command latency and microprocessor bus bandwidth.

Accordingly, what is needed is an efficient method and system which would reduce the amount of latency associated with interfacing with (snooping on) a processor cache.

SUMMARY OF THE INVENTION

The present invention generally provides methods, apparatus, and systems for implementing an efficient coherency protocol for a multiprocessor system.

One embodiment provides a method of maintaining coherency of data stored in a shared memory device that may be accessed by both a remote device and a processor. The method generally includes, at the remote device, generating a bus request to the processor to access data targeted by the request that may be stored in a cache residing on the processor in response detecting an access request issued by a requesting component residing on the remote device and receiving, from the processor, a response to the bus request. The method also includes determining whether or not the response from the processor contains the requested data, and if the response from the processor contains the requested data, returning the data to the requesting component.

Another embodiment provides a method of maintaining coherency of data stored in a shared memory device that may be accessed by both a remote device and a processor. The method generally includes, at the processor, receiving a bus request generated by the remote device targeting data that may be stored in a cache residing on the processor, querying the cache for the data targeted by the request, and, if the data targeted by the request is contained in the cache, sending a bus response containing the targeted data to the remote device.

Another embodiment provides a device configured to access data stored in memory and cacheable by a processor. The device generally includes one or more processing agents, a bus interface to communicate with the processor via a bus, and coherency logic configured to receive memory access requests issued by the processing agents, send requests to the processor via the bus for data targeted by the access requests, receive responses to the bus requests from the processor, determine if the responses contain data targeted by the memory access requests and, if so, return the targeted data to the processing agents.

Another embodiment provides a coherent system generally including a shared memory device, a processor and a remote device. The processor generally includes a cache for storing data accessed from the shared memory device and a cache directory with entries indicating which memory locations are stored in cache lines of the cache and corresponding coherency states thereof. The remote device generally includes one or more processing agents and coherency logic configured to receive memory access requests issued by the processing agents, send requests to the processor via the bus for data targeted by the access requests, receive responses to the bus requests from the processor, determine if the responses contain data targeted by the memory access requests and, if so, return the targeted data to the processing agents.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide methods and apparatus that may be utilized to reduce the amount of latency involved when accessing, by a remote device, data residing in a cache of a processor. For some embodiments, virtual channels may be utilized to conduct request/response transactions between the remote device and processor that satisfy a set of associated coherency rules (a protocol) described herein. The protocol may be designed to minimize transaction queuing and overall latency.

As used herein, the term virtual channel generally refers to a data path that carries both request and/or response information between components. Each virtual channel typically utilizes a different buffer, with a virtual channel number indicating which buffer a packet transferred on that virtual channel will use. Virtual channels are referred to as virtual because, while multiple virtual channels may utilize a single common physical interface (e.g., a bus), they appear and act as separate channels. Virtual channels may be implemented using various logic components (e.g., switches, multiplexors, etc.) utilized to route data, received over the common bus, from different sources to different destinations, in effect, as if there were separate physical channels between each source and destination. An advantage to utilizing virtual channels is that various processes utilizing the data streamed by the virtual channels may operate in parallel which may improve system performance (e.g., while one process is receiving/sending data over the bus, another process may be manipulating data and not need the bus).

In the following description, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

An Exemplary System

Figure 1:
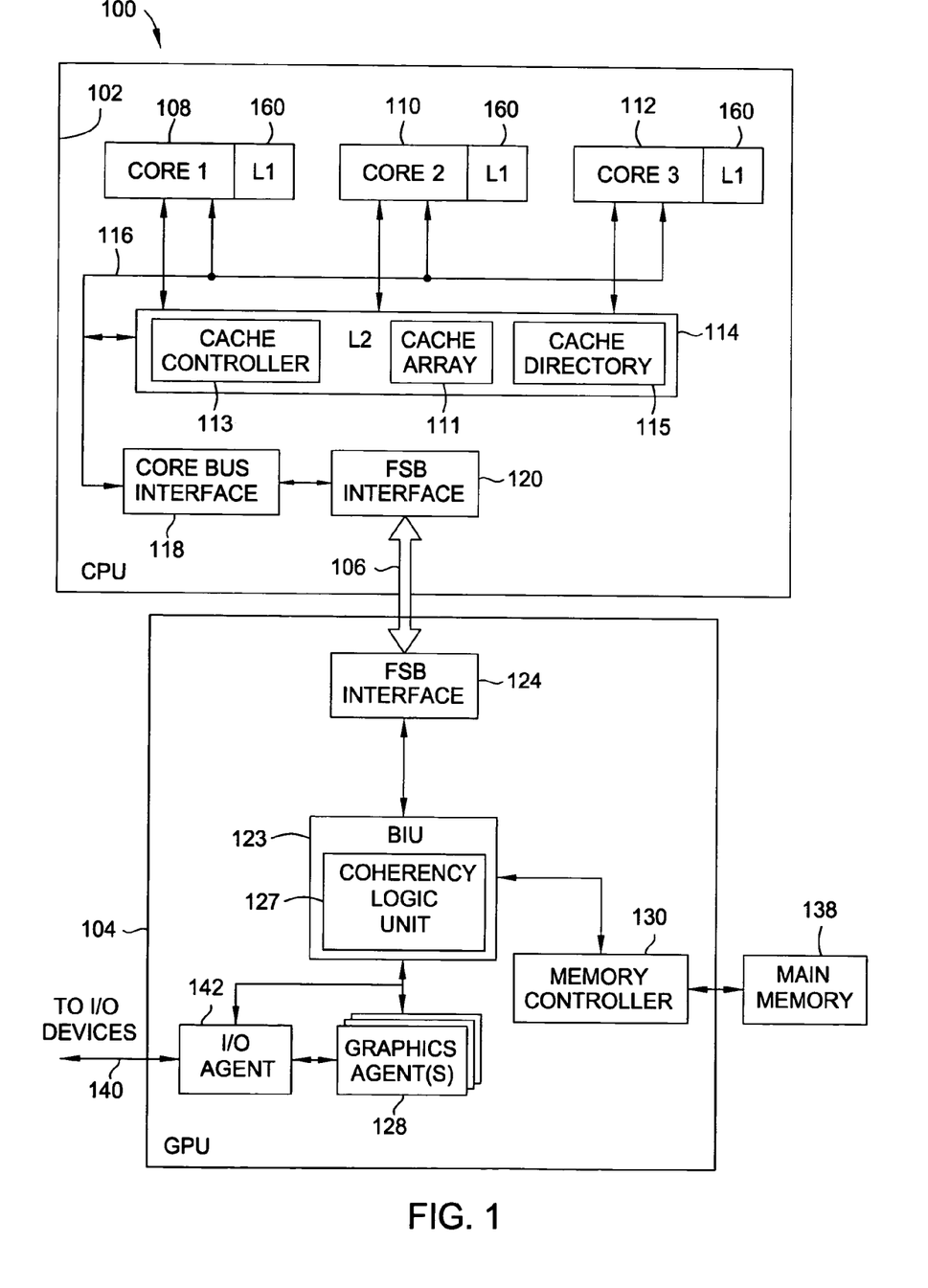
FIG. 1 illustrates an exemplary system in accordance with embodiments of the present invention.

FIG. 1 schematically illustrates an exemplary multi-processor system 100 in which a processor (illustratively, a CPU 102) and a remote processor device (illustratively, a GPU 104) both access a shared main memory 138. While a GPU 104 is shown as an exemplary remote device, the techniques and mechanisms described herein may be utilized in any type of device that has a need to snoop a processor cache, such as an input/output (I/O) controller, audio digital signal processor (DSP), or any other type device. In the illustrated embodiment, main memory 138 is near the GPU 104 and is accessed by a memory controller 130 which, for some embodiments, is integrated with (i.e., located on) the GPU 104. The system 100 is merely one example of a type of system in which embodiments of the present invention may be utilized to maintain coherency of data accessed by multiple devices.

As shown, the CPU 102 and the GPU 104 communicate via a front side bus (FSB) 106. The CPU 102 illustratively includes a plurality of processor cores 108, 110, and 112 that perform tasks under the control of software. The processor cores may each include any number of different type function units including, but not limited to arithmetic logic units (ALUs), floating point units (FPUs), and single instruction multiple data (SIMD) units. Examples of CPUs utilizing multiple processor cores include the Power PC line of CPUs, available from International Business Machines (IBM). Each individual core may have a corresponding L1 cache 160 and may communicate over a common bus 116 that connects to a core bus interface 118. For some embodiments, the individual cores may share an L2 (secondary) cache memory 114.

As illustrated, the L2 cache 114 may include a cache array 111, cache directory 115, and cache controller 113. For some embodiments, the L2 cache 114 may be an associative cache and the cache directory 114 may include entries indicating addresses of cache lines stored in each "way" of an associative set, as well as an indication of a coherency state of each line. For some embodiments, the L2 cache 114 may be operated in accordance with the MESI protocol (supporting Modified, Exclusive, Shared, and Invalid states), or some variant thereof. The core bus interface 118 communicates with the L2 cache memory 114, and carries data transferred into and out of the CPU 102 via the FSB 106, through a front-side bus interface 120.

The GPU 104 also includes a front-side bus interface 124 that connects to the FSB 106 and that is used to pass information between the GPU 104 and the CPU 102. The GPU 104 is a device capable of processing large amounts of data at very high speed using sophisticated data structures and processing techniques. To do so, the GPU 104 includes at least one graphics core 128 that processes data obtained from the CPU 102 or from main memory 138 via the memory controller 130. For some embodiments, the GPU 104 may also include an I/O agent 142 that passes data to and from any number of external devices, such as a mouse, video joy stick, computer board, and display, over a communication link 140. The graphics cores 128 and I/O agent 142 may communicate with the FSB interface 124 via a bus 132.

As previously described, in conventional multi-processor systems, such as system 100, in which one or more remote devices request access to data for memory locations that are cached by a central processor, the remote devices often utilize some type of coherency logic to monitor (snoop) the contents of the processor cache. Typically, this snoop logic interrogates the processor cache directory for entries for every memory location the remote device wishes to access. Once it is determined if the processor has cached data, a request is typically sent to the processor requesting control of the desired data. In response, the processor may release the data or, if modified, write the data back to memory. The remote device may then access the data from memory. Conventional cache snooping may result in substantial latency and consume a significant amount of processor bus bandwidth.

Low Latency Coherency Protocol

Embodiments of the present invention may utilize a coherency protocol and support logic designed to reduce such latency and increase bus bandwidth. The protocol may utilize various techniques and mechanisms designed to minimize queuing of memory access requests issued by the remote device. Examples of such mechanisms include virtual channels to support requests and responses for the direct exchange of data between the remote device and processor, as well as reflected read and write requests when the processor does not have requested data.

Figure 2:
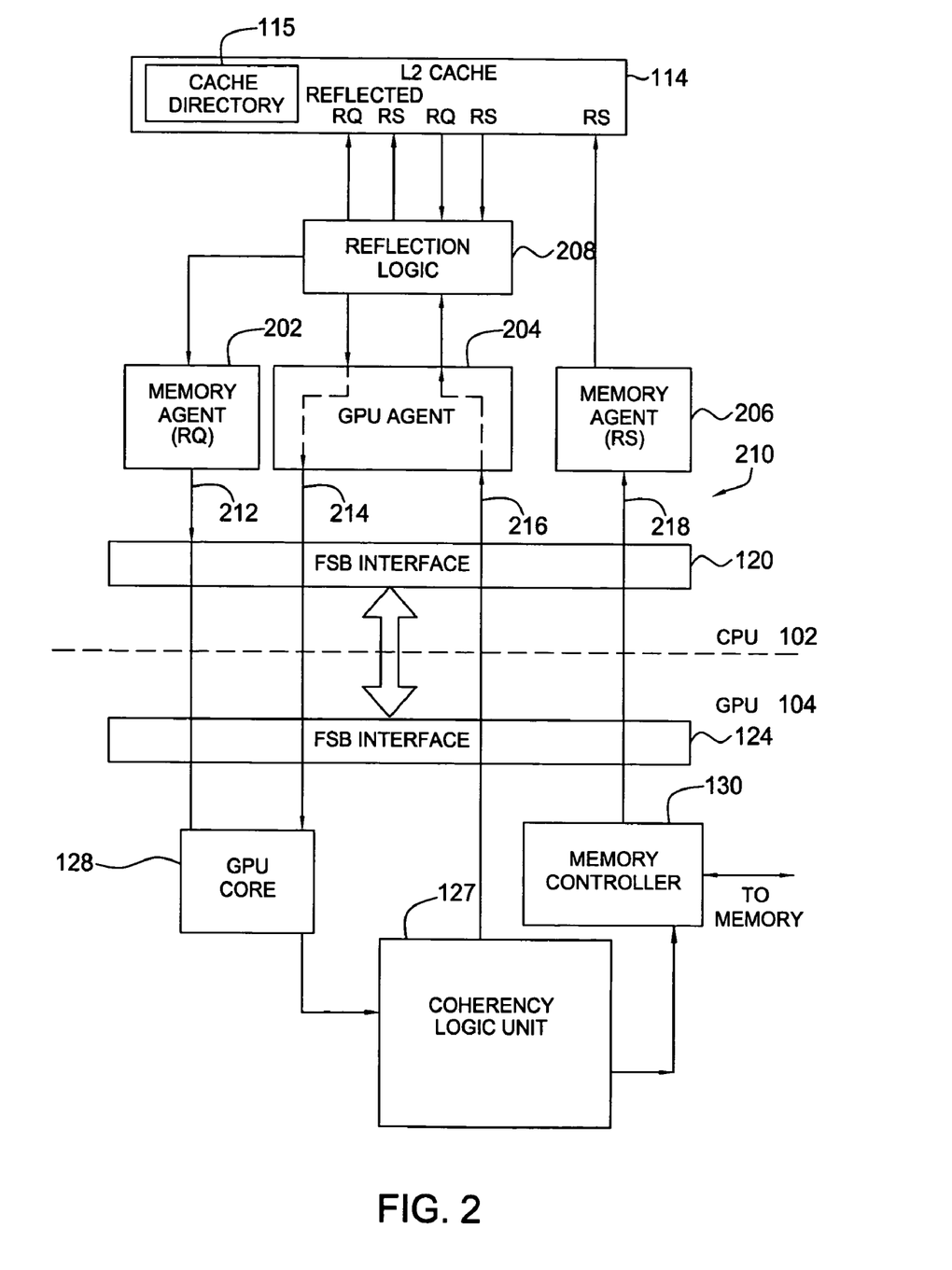
FIG. 2 illustrates an exemplary coherency (snoop) logic configuration, in accordance with embodiments of the present invention.

FIG. 2 illustrates a relational view of one system configuration capable of utilizing such mechanisms to maintain coherency. A coherency logic unit 127 located on a Bus Interface Unit (BIU) 123 of the GPU 104 may be generally configured to receive memory access requests from a GPU core 128 (or I/O master) and, in response, generate bus commands to the CPU 102 to determine if data targeted by the requests reside in the CPU L2 cache 114. As illustrated, the CPU 102 may include various components (e.g., that interface with the L2 cache controller and bus interface) to support system coherency and respond to requests received from the GPU 104. Such components may include memory agents 202 and 206 to route requests to and receive responses from, respectively, memory 138, as well as a GPU agent 204 to route requests to and receive responses from the GPU cores 128 (or I/O masters).

These CPU agents may communicate with the GPU 104 via virtual channels 210 established on the FSB. The virtual channels 210 include "upbound" virtual channels 216 and 218 to handle requests and responses, respectively, from the GPU 104 and "downbound" virtual channels 212 and 214 to handle requests and responses, respectively, from the CPU 102. Data paths through the virtual channels 210 for different transactions under different circumstances are described in detail below, with reference to FIGS. 5A-5B.

Figure 3A:
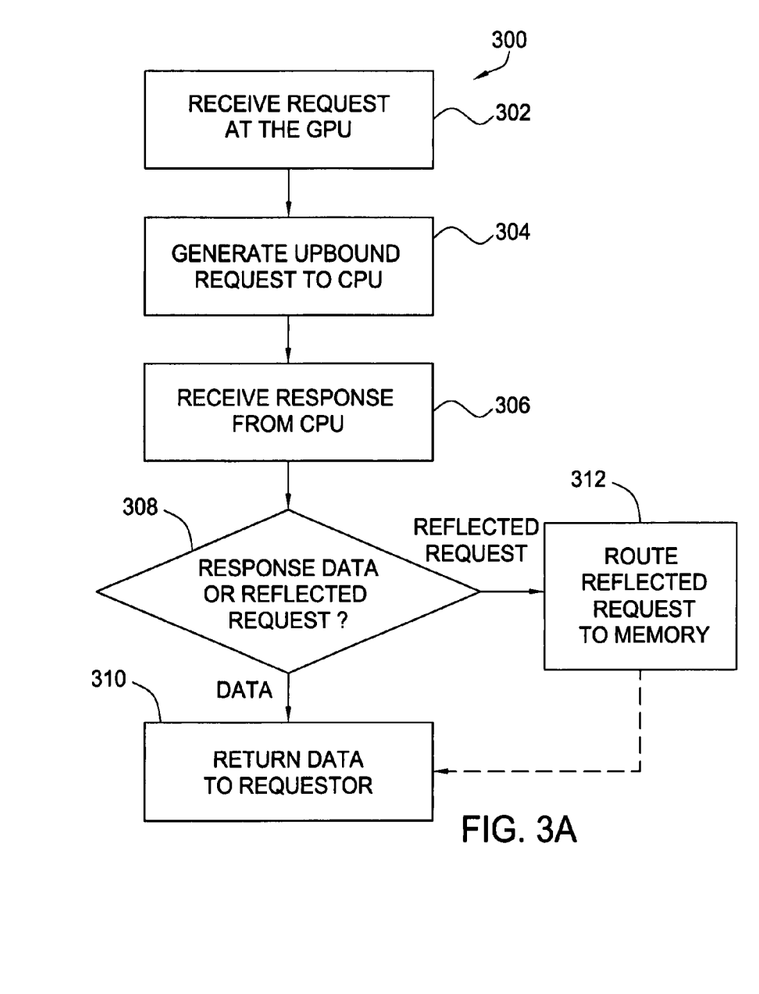
FIGS. 3A and 3B are flow diagrams of exemplary operations that may performed at a remote device and processor, respectively, for maintaining coherency, in accordance with embodiments of the present invention.
Figure 3B:
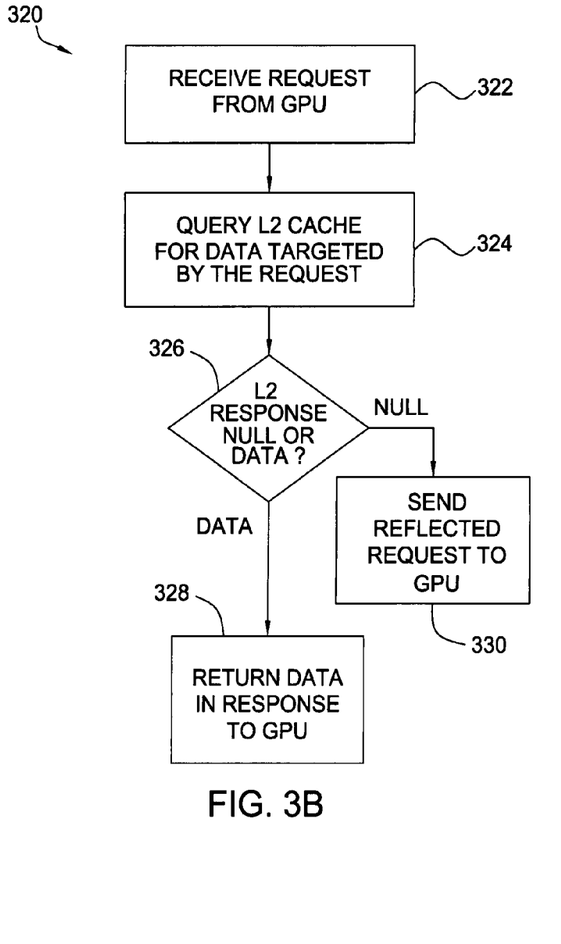

FIGS. 3A and 3B illustrate exemplary operations 300 and 320 that may be performed at the GPU 104 and the CPU 102 respectively, to send responses/requests to coherently access shared main memory. For example, the operations 300 shown in FIG. 3A may be performed by the coherency logic unit 127. The operations 300 begin, at step 302, by receiving a memory access request from some requestor at the GPU 104 (e.g., a graphics agent 128 or I/O agent 142).

In order to determine if a copy of the data targeted by the request is in the CPU cache 114, a bus command (upbound request) to the CPU 102 may be generated, at step 304. At step 306, a response is received from the CPU 102. Depending on the state of the targeted data, the CPU 102 may respond with data (if the targeted data was in the L2 cache 114) or may send back (or "reflect") the access request to be issued on behalf of the GPU 104. If the response contains data, as determined at step 308, the data may be returned to the requester, at step 310. In some cases, if the data has been modified, a write request may also be generated at the GPU to write the modified data to memory. If the response from the CPU 102 is a reflected request, the request may be routed to memory, at step 312.

The operations 320 shown in FIG. 3B may be performed at the CPU 102 (e.g., by the reflection logic 208) to handle and reply to "upbound" requests received from the GPU 104. The operations 320 begin, at step 322, by receiving a request from the GPU 104 and, at step 324, the L2 cache is queried for data targeted by the request. If the L2 responds with data, as determined at step 326, the data is returned to the GPU 104, at step 328. Otherwise, if the L2 does not respond with data (e.g., a NULL response indicating the requested data is not cached), a reflected read is sent to the GPU 104, at step 330.

Figure 4:
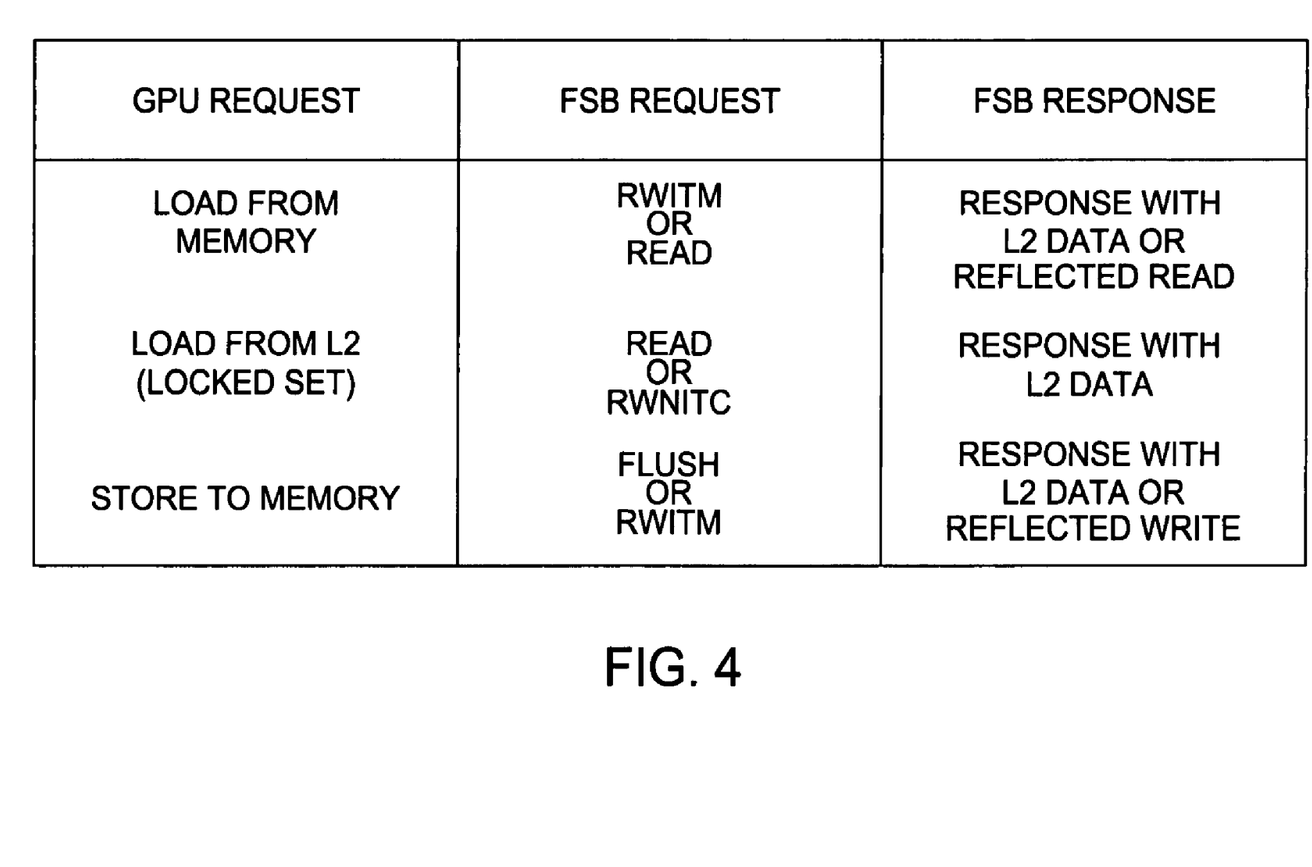
FIG. 4 illustrates exemplary bus requests that may be initiated at a remote device to coherently access data, in accordance with embodiments of the present invention.

FIG. 4 shows a table listing the types of GPU bus requests and corresponding CPU responses might be generated based on various access requests issued by GPU requestors (e.g., GPU or I/O agents). As illustrated, if a request is issued to load data from memory, a read or read with intent to modify (RWITM) request may be generated at the GPU. As a result, the corresponding cache state in the CPU may go from valid to invalid (V to I) or from modified to invalid (M to I) if the data was modified. In some cases, shared states (S) may be supported, indicating the cached copy and the copy in memory are identical. In such cases, depending on the particular implementation of the CPU cache 114, read requests may result in no change to the coherency state or from a transition from S to I. Depending on whether the requested data is cached in the processor, the processor may respond with the data (if it is cached) or a reflected read (if it is not cached). If the data has been modified, the response may indicated the data is dirty, causing a write to be generated at the GPU, as previously described.

In some cases, the GPU 104 may access a special set of L2 registers, referred to as a lock set, that does not require backing to memory (e.g., the GPU reads, but never writes to these registers). The GPU may access these registers via read or read with no intent to cache (RWNITC) requests, while the CPU will respond with the L2 data. As a result, at least for some embodiments, the CPU cache state for these registers may remained unchanged (e.g., as M). The concepts of utilizing such a lock set are described in detail in the commonly owned application, entitled "Direct Access of Cache Lock Set Data Without Backing Memory".

As illustrated, if a request is issued by a GPU requester to store data to memory, a flush request or read with intent to modify (RWITM) may be generated by the GPU. Either request may have the desired affect of causing the CPU cache state to transition to invalid. Depending on whether the requested data is cached in the processor, the processor may respond with the data (if it is cached) or a reflected write (if it is not cached). For some embodiments, the reflected write may include the data to be stored to the targeted memory location which may simply be routed to memory.

Figure 5A:
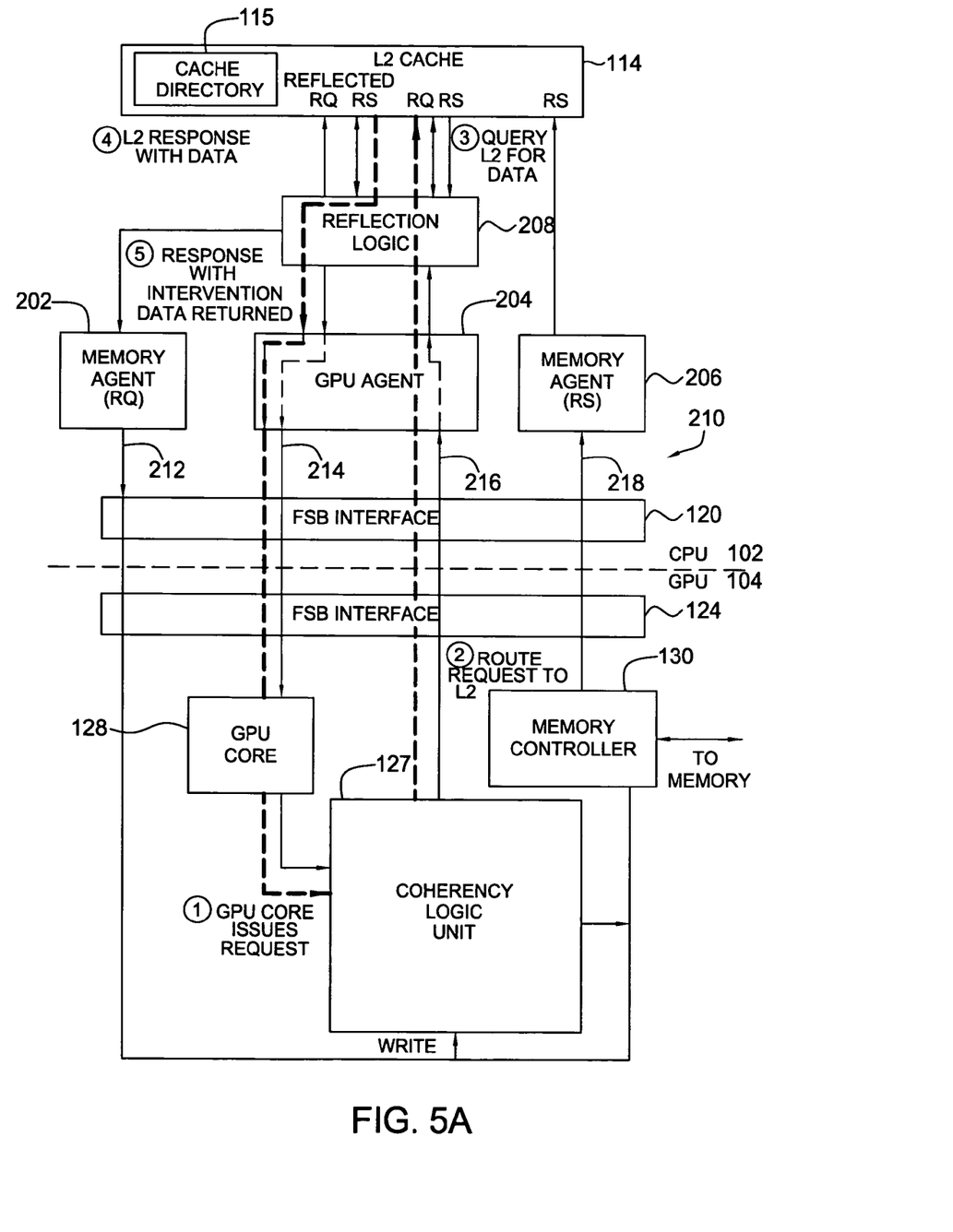
FIGS. 5A-5B illustrate exemplary data path diagrams for remote device memory access requests, in accordance with embodiments of the present invention.
Figure 5B:
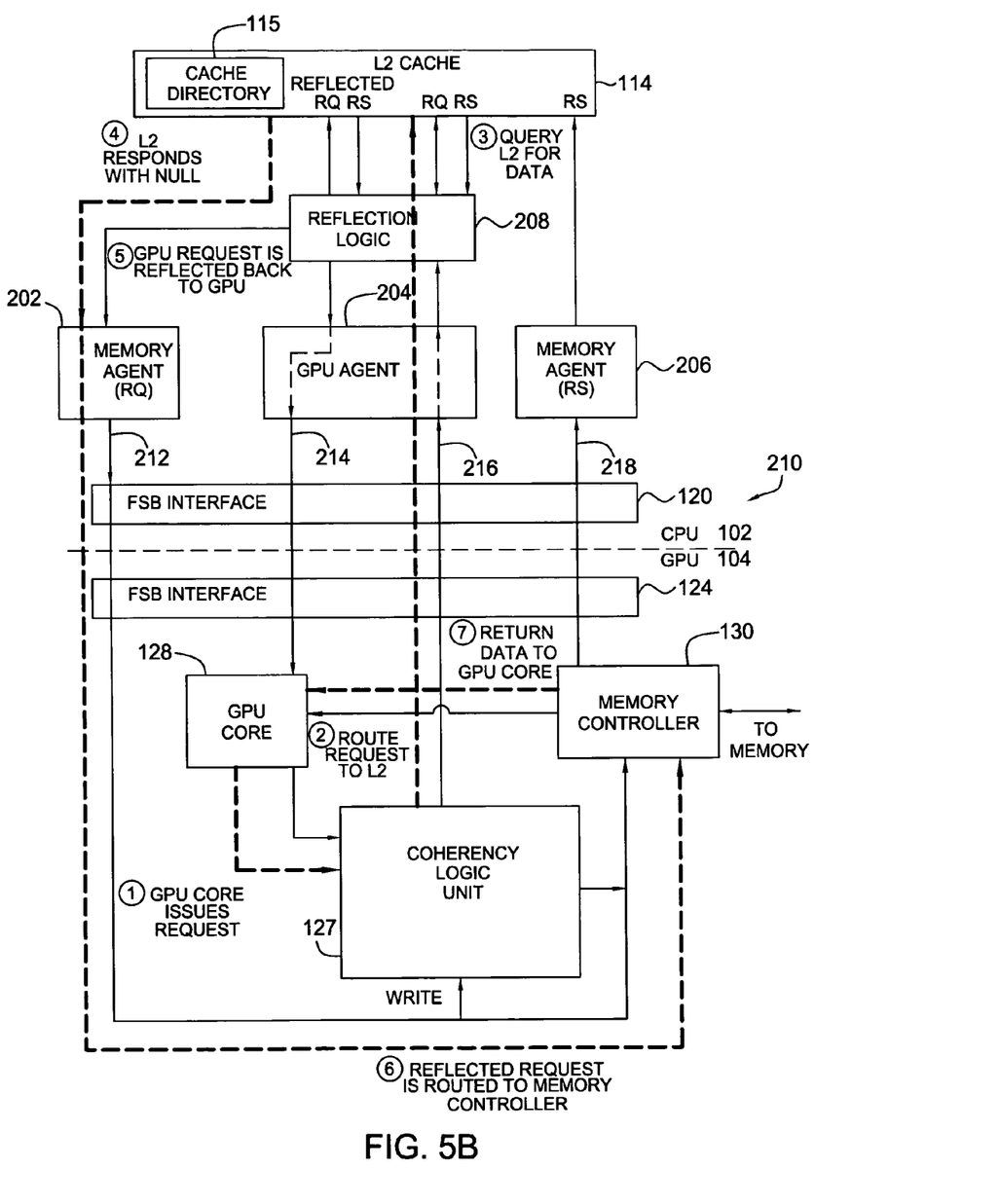

FIGS. 5A-5B illustrate exemplary data path diagrams for remote device memory access requests, depending on whether data targeted by the requests is cached in the CPU or not, respectively. Various events in the transactions are enumerated (e.g., 1-5 in FIG. 5A and 1-7 in FIG. 5B). Referring first to FIG. 5A, a GPU core or other requestor issues a request (1). The coherency logic unit 127 then routes the request to the CPU L2 cache (2). The reflection logic 208 then queries the L2 cache for the requested data (3) and the L2 responds with the requested data (4). Finally, a response containing the data is sent to the GPU 104 (5). In other words, in this scenario, the requesting component receives the requested (and cached) data directly from the CPU 102, without having to access memory 138, thus reducing overall latency.

In conventional coherent systems, after determining a processor has cached a copy of requested data by querying the processor, a requesting device must first gain ownership of the data, for example, by sending a separate request to the processor. After gaining ownership, the requesting device may then access the data from memory. Further, if the data has been modified, the requesting device must typically wait until the modified data has been written back to memory. By returning cached data from the processor directly to the requesting device, as described herein, the data may be made available to the requesting component much sooner than in conventional systems.

FIG. 5B illustrates a reflected request resulting when requested data is not cached by the CPU 102. A GPU core or other requestor issues a read request (1), the coherency logic unit 127 routes the read request to the CPU L2 cache (2), and the reflection logic 208 then queries the L2 cache for the requested data (3), as described above. In this example, however, the L2 cache 114 responds with no data (e.g., a NULL response), indicating the data is not in the L2 cache (4). In response, the reflection logic 208 generates a reflected request sent back to the GPU 104 (5). The reflected read request is then routed directly to memory via the memory controller 130 (6). Finally, the memory controller 130 returns the requested data to the requestor (7).

Snoop Filter

Figure 6:
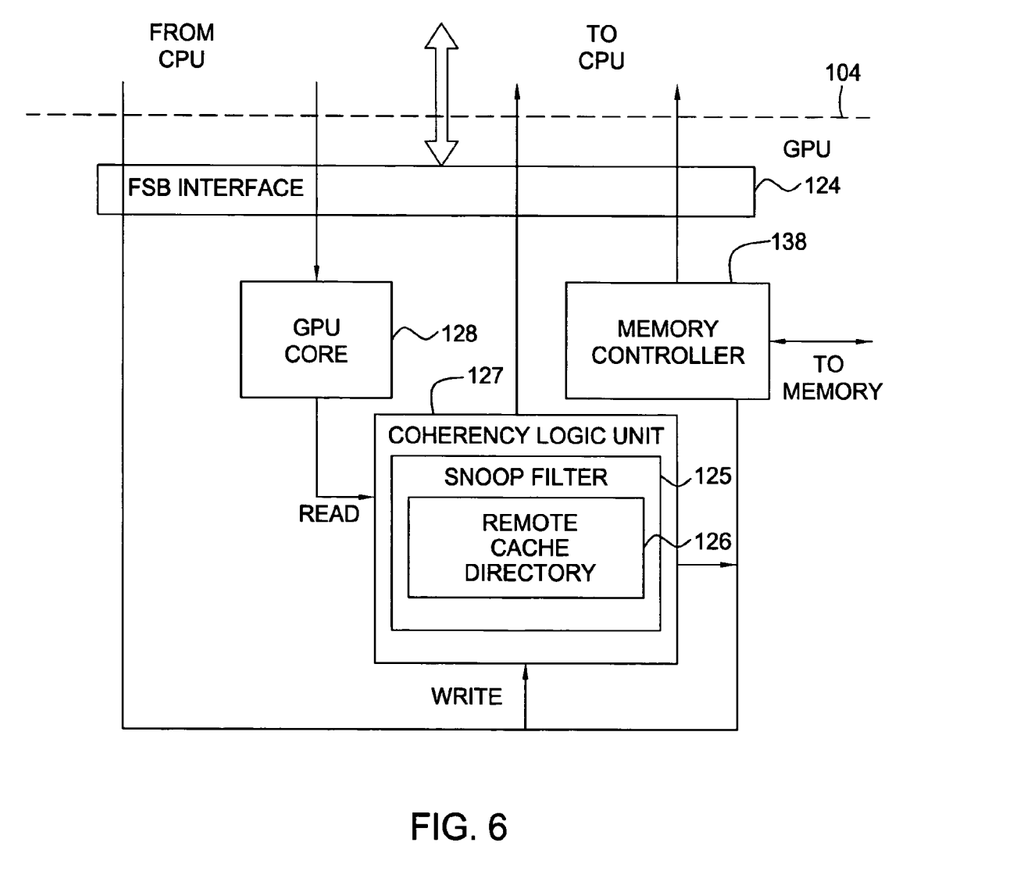
FIG. 6 illustrates an exemplary coherency (snoop) logic configuration utilizing a snoop filter mechanism, in accordance with embodiments of the present invention.

For some embodiments, coherency logic unit 127 on the GPU 104 may include some type of mechanism to reduce the latency resulting as the GPU requester waits the round trip travel time as the request is routed to the L2 cache and reflected back. For example, as illustrated in FIG. 6, for some embodiments, the coherency logic unit 127, in an effort to reduce this latency, some embodiments may utilize an optimization mechanism designed to filter requests out that target data that are not in the L2 cache and can be sent directly to memory. The snoop filter 125 may filter such requests based on a remote cache directory 126 designed to mirror the processor cache directory.

As illustrated, the snoop filter 125 may be placed between all coherent requestors (e.g., I/O agent 142 and graphics agents 128) on the GPU 104 and system memory and CPU caches. In this configuration, all coherent accesses from any requestor can be filtered, such that only those requests that target cache lines indicated to be valid in the processor cache (as determined by examining the remote cache directory 126) may result in snoop commands sent to the processor. Other requests (targeting data that is not cached) may be routed directly to memory, thus reducing latency associated with the snoop requests and responses and conserving bus bandwidth.

Figure 7:
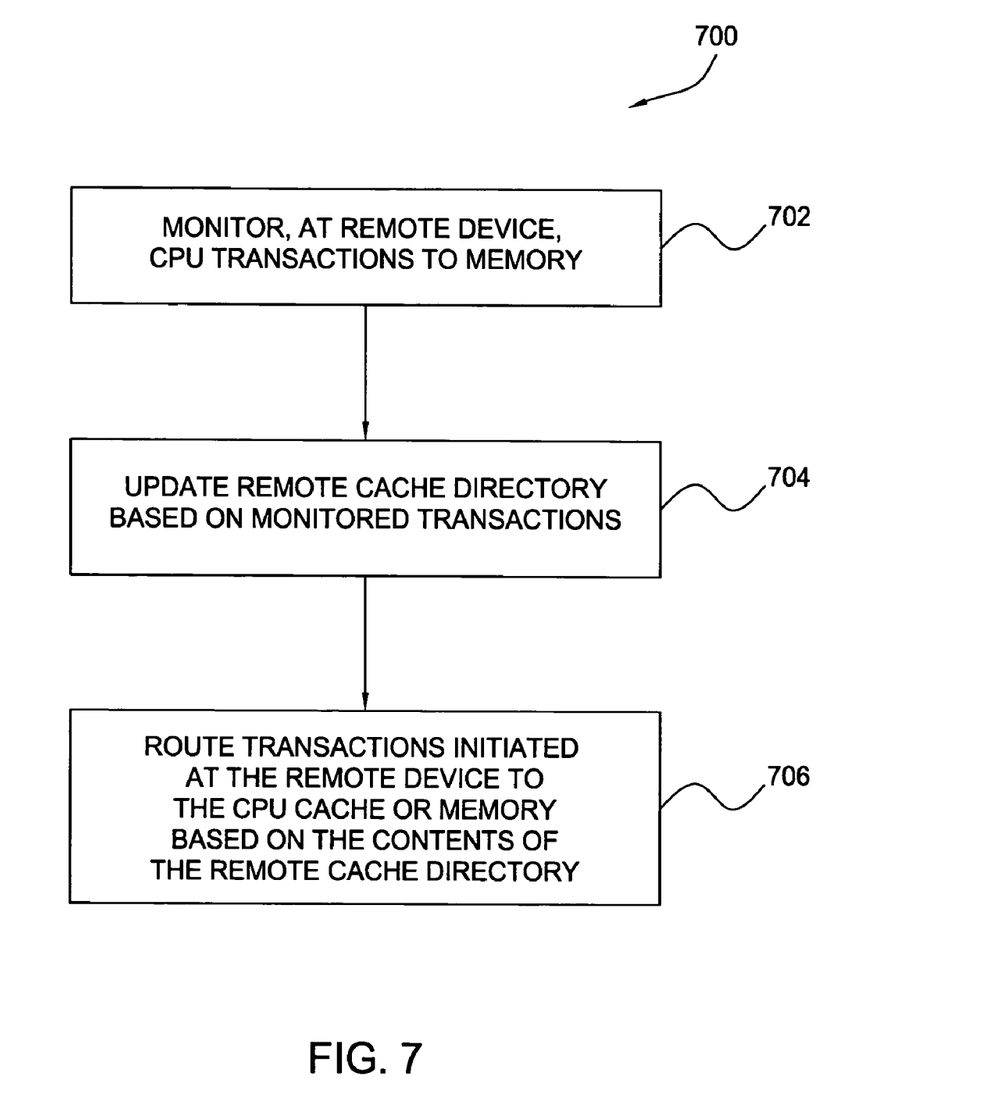
FIG. 7 is a flow diagram of exemplary operations for maintaining cache coherency, in accordance with embodiments of the present invention.

FIG. 7 illustrates exemplary operations 700 that may be performed (e.g., by the snoop filter 125) to update the remote cache directory 126 and route coherent requests accordingly. The operations begin, at step 702, by monitoring, at a remote device (e.g., the GPU 104), CPU transactions to memory. At step 704, the remote cache directory is updated based on the monitored transaction, to reflect changes to the CPU cache directory. At step 706, transactions originating at the remote device are routed to the CPU cache or directly to memory based on the contents of the remote cache directory.

By routing memory requests from the CPU through the remote device (GPU 104), the snoop filter 125 may update the remote cache directory 126 to reflect changes to the CPU cache directory 115, based on information contained in the requests, without separate bus commands to "snoop" the CPU cache directory. For some embodiments, the snoop filter 125 may monitor these transactions "in parallel" as they are sent to the memory controller 130, without adding latency to the CPU transaction processing. In some cases, the CPU transactions monitored by the snoop filter 125 may be enhanced bus transactions that include additional coherency information, such as a set_id indicating a way within an associative set of cache lines that is being allocated. This information allows the snoop filter 125 to create/modify a corresponding entry (for the specified way) reflecting the location being cached and the coherency state. By indicating the way of the cache line being allocated/de-allocated, this additional information may allow the remote cache directory to be the same size as the CPU cache directory, for some embodiments. The creation and utilization of such enhanced bus transactions are described in the commonly owned U.S. Patent application entitled "Enhanced Bus Transactions for Efficient Support of a Remote Cache Directory Copy".

Figure 8:
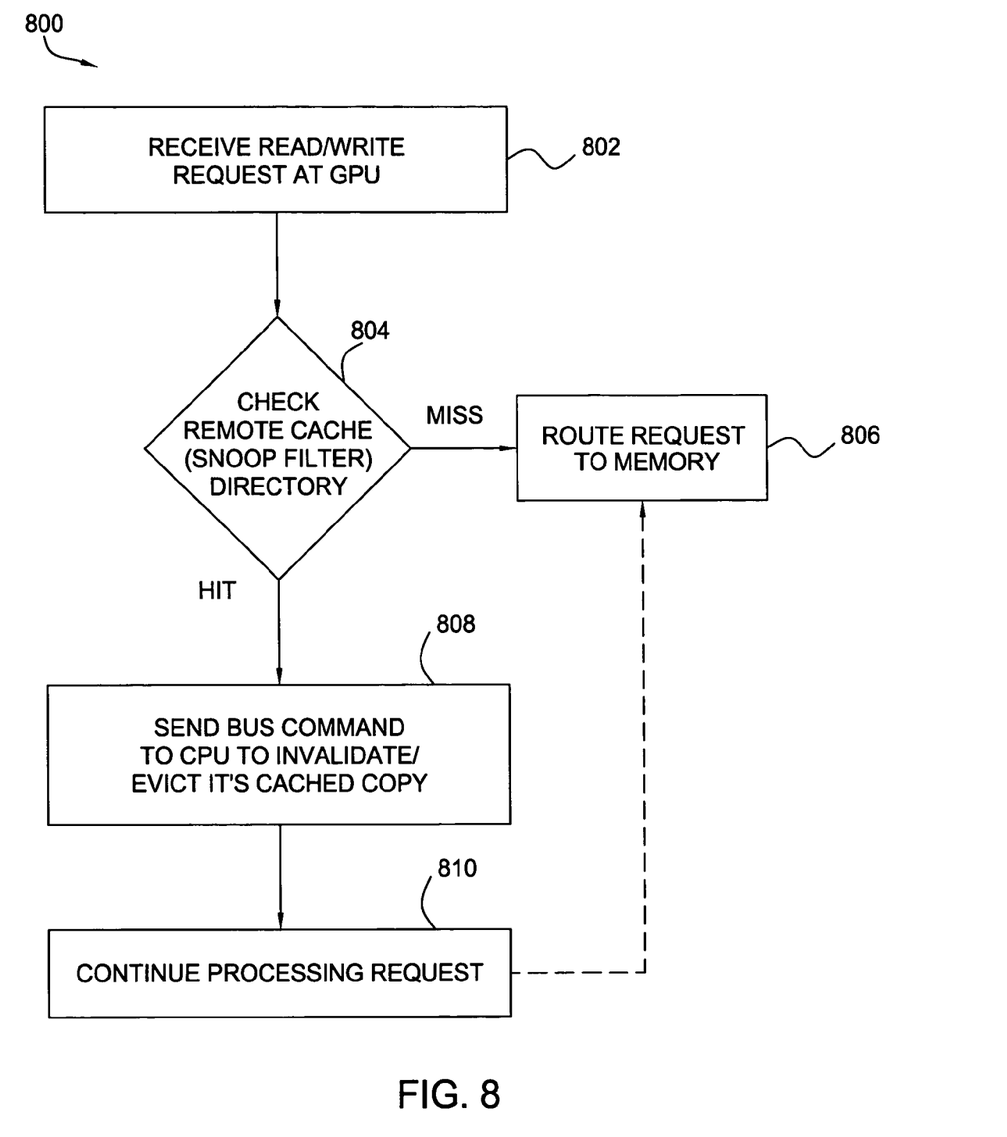
FIG. 8 is a flow diagram of exemplary operations for routing remote device memory access requests based on the contents of the remote cache directory, in accordance with embodiments of the present invention.
Figure 9A:
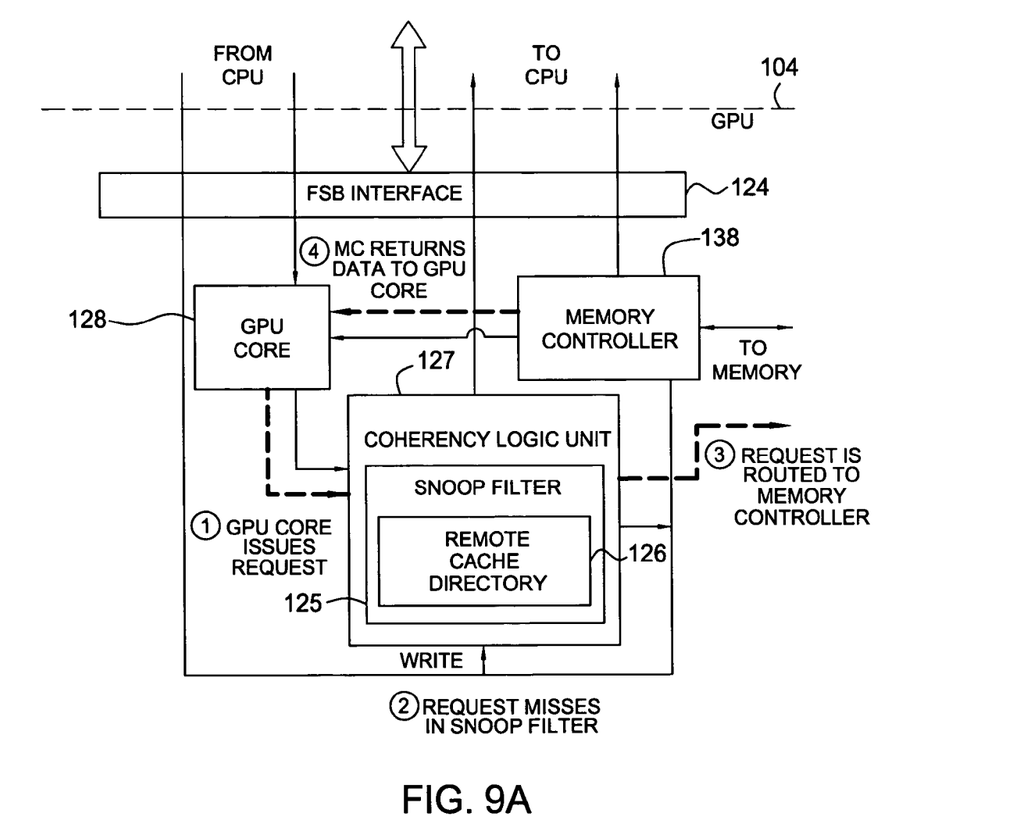
FIGS. 9A-9B illustrate exemplary data path diagrams for remote device memory access requests, in accordance with embodiments of the present invention.

FIG. 8 is a flow diagram (of exemplary operations 800) the GPU snoop filter 125 may perform to route (filter) requests issued at the GPU 104. At step 802, the snoop filter receives a read/write request originating at the GPU. If the request misses in the remote cache directory 126, as determined at step 804, the request is routed directly to memory, at step 806. This scenario is illustrated in the exemplary data path diagram of FIG. 9A, in which various events are enumerated as in FIGS. 5A-B. First, a GPU core or other requestor issues a request (1). Second, the request misses in the snoop filter directory 126 (2), indicating a targeted cache line does not presently reside in the L2 cache 114 in a valid state. Accordingly, the request is routed to memory, via the memory controller 130 (3). Finally, the memory controller 130 returns the requested data to the GPU core (4).

Referring back to FIG. 8, if a request issued at the GPU hits in the remote cache directory (indicating a copy of the requested data is in the L2 cache), a bus command is sent to the CPU to invalidate or evict its cached copy or, in some cases, to read the requested data directly from the L2 cache, at step 808. Processing of the request may continue, at step 810, for example, by routing the request to memory (step 806) after the CPU has invalidated/cast out its cached copy of the requested data.

Figure 9B:
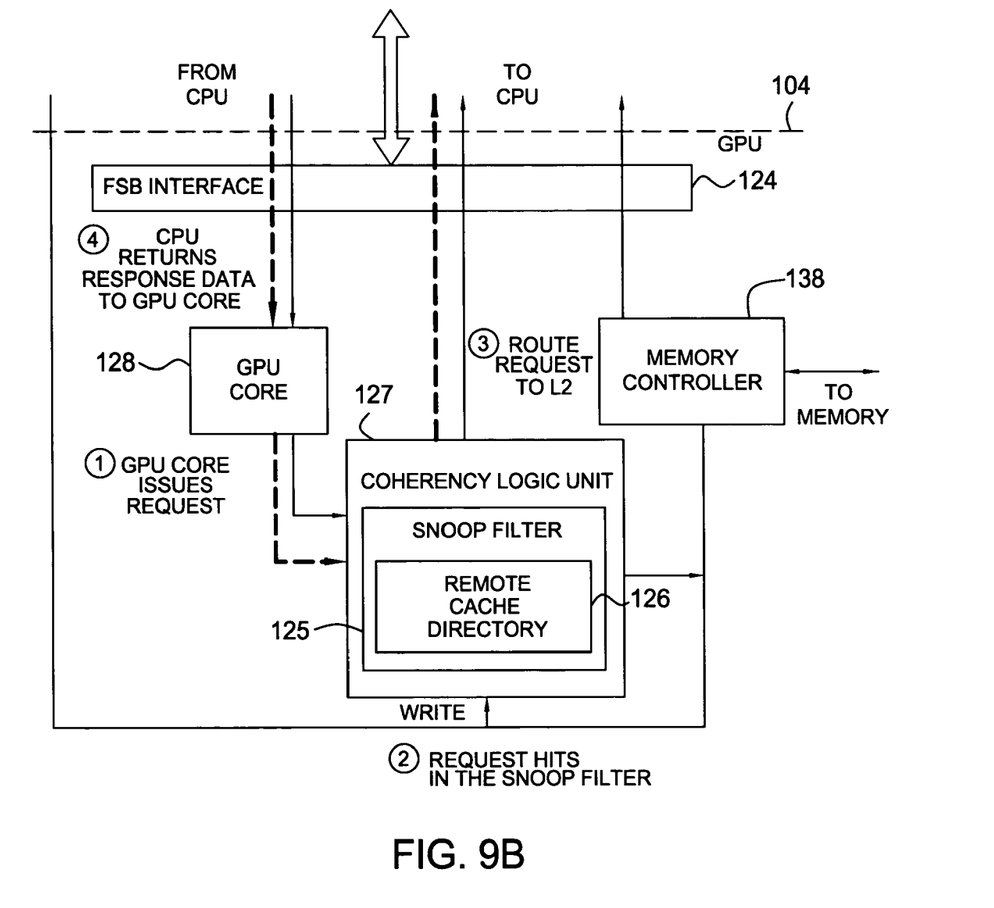

As previously described, in some cases, data may be returned by the CPU 102 directly to the GPU 104 (provided the data is actually cached in the L2 cache). This scenario is illustrated in the exemplary data path diagram of FIG. 9B, which illustrates the routing of a request for data that is cached in the L2 114 in a valid state. First, a GPU core or other requestor issues a request (1). Second, the request hits in the snoop filter directory 126, indicating a targeted cache line resides in the L2 cache 114 in a valid state. Accordingly, a request is routed to the L2 114 (3). For some embodiments, and in some instances, the L2 114 logic may respond by sending a response with the requested data directly to the requesting GPU core (4). This approach may reduce latency by eliminating the need for the GPU core to generate a separate response to read the requested memory.

It should be noted that, in some cases, the remote cache directory 126 may indicate more valid cache lines are in the L2 cache 114 than are indicated by the CPU cache directory 115 (e.g., the valid cache lines indicated by the remote cache directory may represent a superset of the actual valid cache lines). This is because cache lines in the L2 cache 114 may transition from Exclusive (E) or Shared (S) to Invalid (I) without any corresponding bus operations to signal these transitions. In such cases, the CPU 102 may respond to requests from the GPU 104 with reflected read (or write) requests, as previously described with reference to FIG. 5B. These reflected requests may be routed to the memory controller 130 for execution against memory. In such cases, the memory controller 130 may then respond with requested data (assuming a read request) directly to the requesting GPU core.

CONCLUSION

By providing a low latency coherency protocol for a multi-chip, multiprocessor system, embodiments of the present invention may be used to reduce the amount of latency involved in coherent memory accesses. For some embodiments, a snoop filter may be utilized to limit the number of snoop requests sent between a remote device and a processor, which may further reduce latency, as well as conserving bus bandwidth, by routing certain access requests directly memory.

While the foregoing is directed to embodiments of the present invention, other and further embodiments of the invention may be devised without departing from the basic scope thereof, and the scope thereof is determined by the claims that follow.

What is claimed is:

1. A method of maintaining coherency of data stored in a shared memory device that may be accessed by both a remote device and a processor, comprising, at the remote device:
   in response to detecting an access request issued by a requesting component residing on the remote device, generating a bus request to the processor on a first virtual channel established on a bus between the processor and the remote device to access a requested data targeted by the bus request that may be stored in a cache residing on the processor;
   receiving, from the processor, a response to the bus request on at least a second virtual channel established on the bus between the processor and the remote device; and
   determining whether or not the response from the processor contains the requested data;
      if the response from the processor contains the requested data, returning the data to the requesting component;
      if the response from the processor is a reflected request generated by a reflection logic residing on the processor, wherein the reflected request does not contain the requested data, routing the reflected request to the shared memory device.

2. The method of claim 1, wherein receiving, from the processor, the response to the bus request comprises receiving the response on at least the second virtual channel established on the bus between the processor and the remote device comprises:
   receiving a response containing the targeted data over the second virtual channel if the targeted data is stored in the cache residing on the processor; or
   receiving the reflected request over a third virtual channel if the targeted data is not stored in the cache residing on the processor.

3. The method of claim 2, further comprising: maintaining, on the remote device, a remote cache directory indicative of memory locations stored in the cache residing on the processor; and
   generating the bus request to the processor to access data targeted by the access request in response to determining the targeted data may be stored in the cache residing on the processor based on information contained in the remote cache directory.

4. The method of claim 3, further comprising:
   filtering access requests targeting data that is not stored in the cache residing on the processor, based on information contained in the remote cache directory; and
   routing the filtered access requests to the memory device without generating bus requests to the processor.

5. The method of claim 3, wherein maintaining the remote cache directory comprises monitoring, at the remote device, requests to memory issued by the processor.

* * * * *